United States Patent [19]
Vanderwerf

[11] Patent Number: 5,453,880
[45] Date of Patent: * Sep. 26, 1995

[54] OVERHEAD PROJECTOR WITH ACHROMATIC FRESNEL LENS

[75] Inventor: Dennis F. Vanderwerf, Austin, Tex.

[73] Assignee: Minnesota Mining and Manufacturing Company, St. Paul, Minn.

[*] Notice: The portion of the term of this patent subsequent to May 31, 2011 has been disclaimed.

[21] Appl. No.: 219,654

[22] Filed: Mar. 29, 1994

Related U.S. Application Data

[62] Division of Ser. No. 84,513, Jun. 29, 1993, Pat. No. 5,317,349.

[51] Int. Cl.$^6$ ............................ G02B 3/08; G02B 17/00
[52] U.S. Cl. .............................. 359/742; 359/726
[58] Field of Search .................... 359/742, 743, 359/726

[56] References Cited

U.S. PATENT DOCUMENTS

4,108,540  8/1978  Anderson et al. .............. 359/742
5,317,349  5/1994  Vanderwerf .................... 353/38

*Primary Examiner*—Scott J. Sugerman
*Attorney, Agent, or Firm*—Gary L. Griswold; Walter N. Kirn; Jack V. Musgrove

[57] ABSTRACT

A low-profile, transmissive overhead projector (OHP) employs a novel condensing lens system having a catadioptric Fresnel lens and a dioptric Fresnel lens. Each of the lenses exhibits chromatic aberration, but the dispersion of one lens is selected to cancel out the dispersion of the other, e.g., if the catadioptric lens has negative dispersion then the dioptric lens is selected to have positive dispersion. The mutual cancellation of the dispersion of each lens practically eliminates longitudinal chromatic aberration through the lens system. The lens system provides a fast condensing system which allows collimation, dispersion or concentration of light striking the lens at a high angle of incidence. This characteristic is particularly suited for a low-profile OHP as it allows the light source to be placed directly under, but very close to, the stage area.

13 Claims, 9 Drawing Sheets

OVERHEAD PROJECTOR WITH ACHROMATIC FRESNEL LENS

This is a division of application Ser. No. 08/084,513 field Jun. 29, 1993 now U.S. Pat. No. 5,317,349.

BACKGROUND OF THE INVENTION

1. Field of the Invention

The present invention generally relates to optical lenses and projection systems, and more particularly to an achromatic, Fresnel lens which may be used in a low-profile overhead projector.

2. Description of the Prior Art

Transmissive overhead projectors (OHP's) are known in the art, and are generally comprised of a base having a transparent stage area, a light source inside the base, a projection head mounted above the stage, and a condensing lens system located near the stage for collecting and directing the light towards the projector head. The condensing lens system often takes the form of a Fresnel lens or a two-element Fresnel lens combination, as depicted in U.S. Pat. No. 4,436,393.

Several attempts have been made to decrease the base height of OHP's, for portability and reduced obstruction of the projected image during use. To achieve such a low-profile base, some machines collapse during storage or transportation, then expand open for actual use. Machines of this type are described, for example, in U.S. Pat. Nos. 4,969,733 and German Patent Application No. 3,519,506. These collapsible OHP's have several disadvantages, however, such as requiring additional parts which increase the complexity of the machine and add to its cost; the moving parts may also adversely affect alignment of the optical elements over time. Finally, there is no base height advantage of these machines over conventional OHP's when in operation.

Other attempts have been made to construct a low base height OHP without the need to collapse the base and optical elements. For example, U.S. Pat. No. 4,741,613 employs a three-element refracting Fresnel lens system to allow the point light source to be very close to the stage. There are several aspects of this invention, however, which could be improved. First, the requirement of three Fresnel lenses necessarily adds to the cost. Secondly, this system does not adequately compensate for the diminished illumination near the periphery of the stage area. Finally, the dispersion (chromaticity) of a conventional Fresnel lens may lead to coloration of the projected image, particularly around the periphery thereof. Most OHP's locate the light source within the base to minimize this effect, but it is noticeable any time the projection head is moved from its optimum position. For example, if the projection head must be lowered to magnify an image or focus it on the projection screen, less red light at the periphery of the stage is captured by the projection lens, leading to a bluish tint at the border of the projected image. Similarly, moving the projection head up (away from the stage) can cause the border to have a reddish tint. This effect (which is even more pronounced in the three-element system of the '613 patent) can be overcome by repositioning the lamp within the base (referred to as "color tuning"), but this involves further user manipulation of the OHP and still requires a subjective judgment regarding the chromaticity of the projected image. Color tunability also adds to the cost of the OHP since it requires a mechanism for repositioning the lamp.

The OHP's disclosed in U.S. Pat. Nos. 4,118,761 and 4,952,053 use folded optical paths to provide a more compact base. In the '761 patent, the light source is also "off-axis," meaning that the apparent location of the light source does not coincide with the center of the stage, i.e., the apparent location is displaced from the normal to the stage center. That device requires a complex optical system including a parabolic reflector to provide collimated light, two planar grooved reflectors, and the condensing lens assembly; it may exhibit a slightly darkened edge, furthest from the light source. In the '053 patent, the darkened edges are compensated for by providing two light sources. The twisted and curved mirrored, grooved prisms are also more difficult to fabricate than flat condensers. Finally, folded optical paths may create problems with full-size stage formats, such as European (A4) styles, since extremely tight folds such as are necessary to achieve a low-profile may cause the light source itself to interfere with the folded light path.

The OHP of the present invention overcomes several of the above limitations by using a novel catadioptric Fresnel lens. While the use of any catadioptric lens in an OHP is in itself novel, catadioptric lenses are known in other art areas. The term "catadioptric" refers to a lens which uses both reflection and refraction to redirect or bend light waves. See, e.g., U.S. Pat. Nos. 2,003,804, 4,859,043 and 5,097,395. As depicted in those patents, catadioptric lenses are useful in collimating light, similar to Fresnel lenses. In U.S. Pat. No. 5,150,966, a catadioptric lens is used to adjust light intensity distribution by discarding light. See also U.S. Pat. No. 4,755,921, which describes a single element catadioptric lens having increased efficiency at high entrance angles, thereby providing a "fast" lens (low f-number) that is suited for compact optical devices.

Chromatic aberration is also a problem with catadioptric Fresnel lenses. The dispersion is caused by the optical properties of the lens material, i.e., its index of refraction varies with the wavelength of the light passing therethrough. There are several techniques, however, for minimizing this effect. For example, attempts have also been made to minimize chromatic aberration in single element lenses, such as by providing discontinuous axisymmetric surfaces, or by using aspheric surfaces. Diffraction gratings may be placed on the lens, including on a Fresnel lens, as depicted in U.S. Pat. No. 5,161,057. See also U.S. Pat. No. 4,337,759, which describes a curved base, catadioptric Fresnel lens with a controlled amount of chromatic dispersion for use as a solar concentrator. Many of the foregoing techniques minimize dispersion only for selected wavelengths, as opposed to the full (visible) spectrum. Most of the techniques (including the '759 patent) also require materials having specific indices of refraction, to achieve a specific focal length with color correction.

In light of the foregoing, it would be desirable and innovative to design a Fresnel lens which is usable in a low-profile OHP. The lens would advantageously be achromatic and constructed of any number of light-transmissive materials having a large range of refractive indices, and efficiently focus the light to the projection lens of the OHP. The condensing system preferably would avoid the use of micro-precision diffraction gratings, and would generally minimize the number of optical elements (such as grooved mirrors), including the number of elements in the condensing lens, but still be compatible with a folded optical path. Provision of such an achromatic lens would greatly reduce or minimize the need for color tuning.

SUMMARY OF THE INVENTION

The present invention provides a overhead projector generally comprising a base having a stage area, a projector head mounted to the base proximate the stage area, a light source below the stage area, and a condensing lens system which includes a catadioptric Fresnel lens element and a conventional refracting Fresnel lens. The catadioptric lens and the refracting (dioptric) lens both exhibit chromatic dispersion, but the surface structure of the catadioptric lens is designed to yield a negative dispersion which cancels the positive dispersion of the dioptric lens. The combined lens doublet is thus achromatic over all visible colors, practically eliminating the need for color tuning, and color correction is independent of the material used, provided only that the two lenses are constructed of materials which have approximately identical indices of refraction. The lens doublet is particularly useful in a low-profile overhead projector wherein the lamp is directly underneath the lens doublet, i.e., without a folded optical path.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
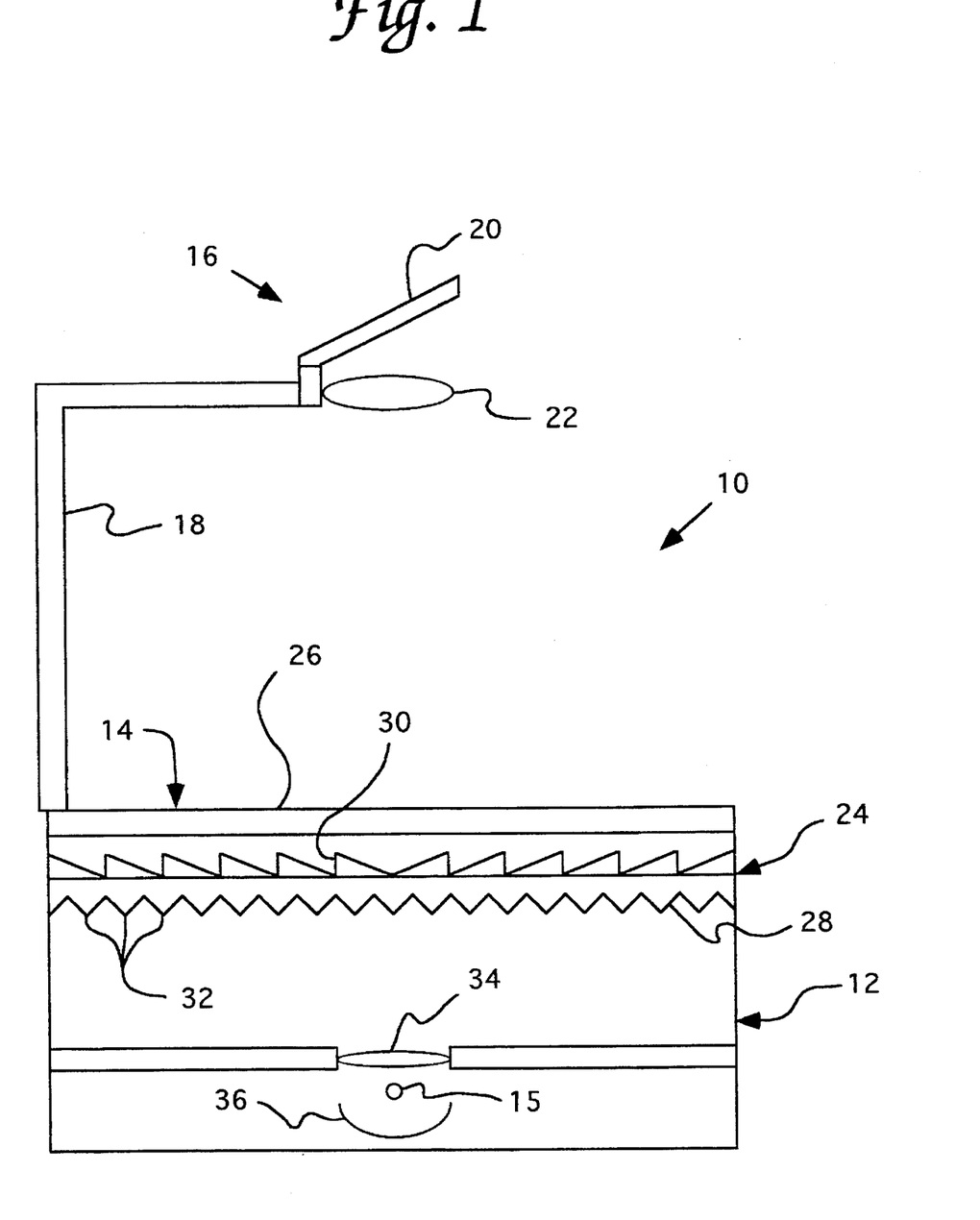
FIG. 1 is a side elevational view of one embodiment of the overhead projector of the present invention.

With reference now to the figures, and in particular with reference to FIG. 1, there is depicted one embodiment of the overhead projector (OHP) 10 of the present invention. OHP 10 is generally comprised of a base 12 having a stage area 14, and a conventional projector head 16 mounted to base 12 by arm 18. Base 12 may be constructed of any durable material, particularly a polymer such as a blend of polycarbonate and acrylonitrile butadiene styrene (ABS). Base 12 houses many standard components (not all shown), including a lamp or light source 15, a fan or circulation system to cool the light source, a power control for the light source and motor, a manual switch for the power control, and a cable for connection to an external power supply. Projector head 16 includes a folding mirror 20 and a multi-element projection lens 22, preferably of the varifocal type having a focal length variation to control focus and screen size. Means (not shown) may be provided to releasably secure arm 18 in a storage/transportation position. Other conventional features may optionally be provided as deemed desirable.

The novelty of the present invention lies in the provision of an achromatic condensing lens system 24 interposed between stage 14 and light source 15. While lens system 24 may be used in many applications, it is used here as a convergent lens to focus the image placed at stage 14 toward projection lens 22. Lens system 24 may be attached to or integrally formed with the lower surface of a writing platen 26 located at stage area 14. Platen 26 preferably comprises a chemically strengthened (breakage-resistant) glass sheet. In the preferred embodiment, lens system 24 consists of two elements, a catadioptric Fresnel lens 28 and a dioptric (refractive) Fresnel lens 30.

Figure 2:
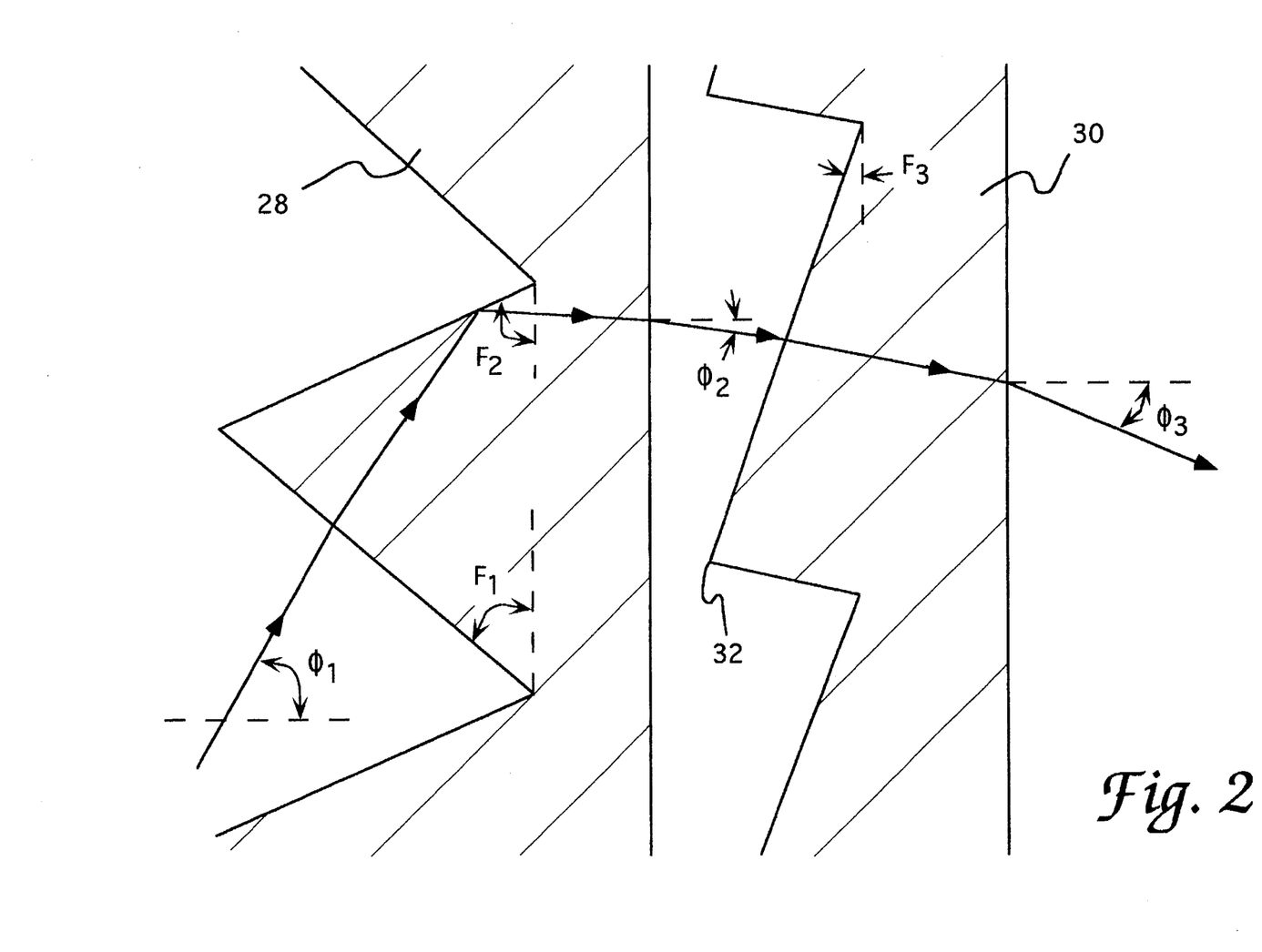
FIG. 2 is a detail view of one embodiment of the (doublet) achromatic lens system used in the overhead projector of the present invention.

With further reference to FIG. 2, each of the lenses 28 and 30 has a plurality of prisms or ridges 32 forming grooves in their respective lower surfaces. Those skilled in the art will appreciate that ridges 32 may be straight (parallel) provided light from lamp 15 is collimated prior to striking lens system 24; however, it is deemed more desirable to form circular (arcuate) ridges requiring no prior collimation. Interference patterns caused by overlap of the ridges in lenses 28 and 30 may be minimized by separation of the elements and selection of appropriate groove width ratios (see U.S. Pat. No. 4,900,129). The radial center of the grooves of each lens are preferably located within the borders of stage area 14, most preferably at the geometric center of the stage. The centers (or effective centers) of the grooves of lenses 28 and 30 coincide. In this configuration, lamp 15 is positioned on the axis of lens system 24, i.e., along the normal to lenses 28 and 30 at their common radial center. Since lamp 15 is so placed directly below lens system 24, it may be seen through the lens system; this can be prevented by using optional diffusing risers (bumps) on the upper surface of lens A condenser lens 34 and back reflector 36 collect light from lamp 15 and direct it toward lens system 24. Condenser 34 is preferably made of a heat-resistant material, such as low-expansion borosilicate glass, to withstand the temperatures generated by lamp 15; this is particularly desirable since one object of this invention is to provide a low-profile OHP in which condenser 34 and lamp 15 would be in close proximity (e.g., 9 cm). Further, light source 15 may be a high intensity lamp which radiates a relatively large amount of heat. Lenses 28 and 30 may be glass, but they are preferably constructed of any durable material of high transparency which can be molded or impressed to yield ridges 32, particularly a thermoplastic resin such as polymethylmethacrylate. The material for lenses 28 and 30 should have a sufficiently high index of refraction to assure total internal reflection (TIR), i.e., at least about 1.4.

Lenses 28 and 30 both exhibit chromatic aberration, but the present invention advantageously designs one of these elements to have a negative dispersion which cancels out the positive dispersion of the other element. Thus, the combined doublet is free of longitudinal chromatic aberration. This should be contrasted with the lens system of copending U.S. patent application Ser. No. 07/988,851, which also describes a catadioptric/dioptric lens doublet, but the elements of that system are offset (i.e., the effective centers of the grooves do not coincide), and they are independent in their chromatic properties.

Figure 3:
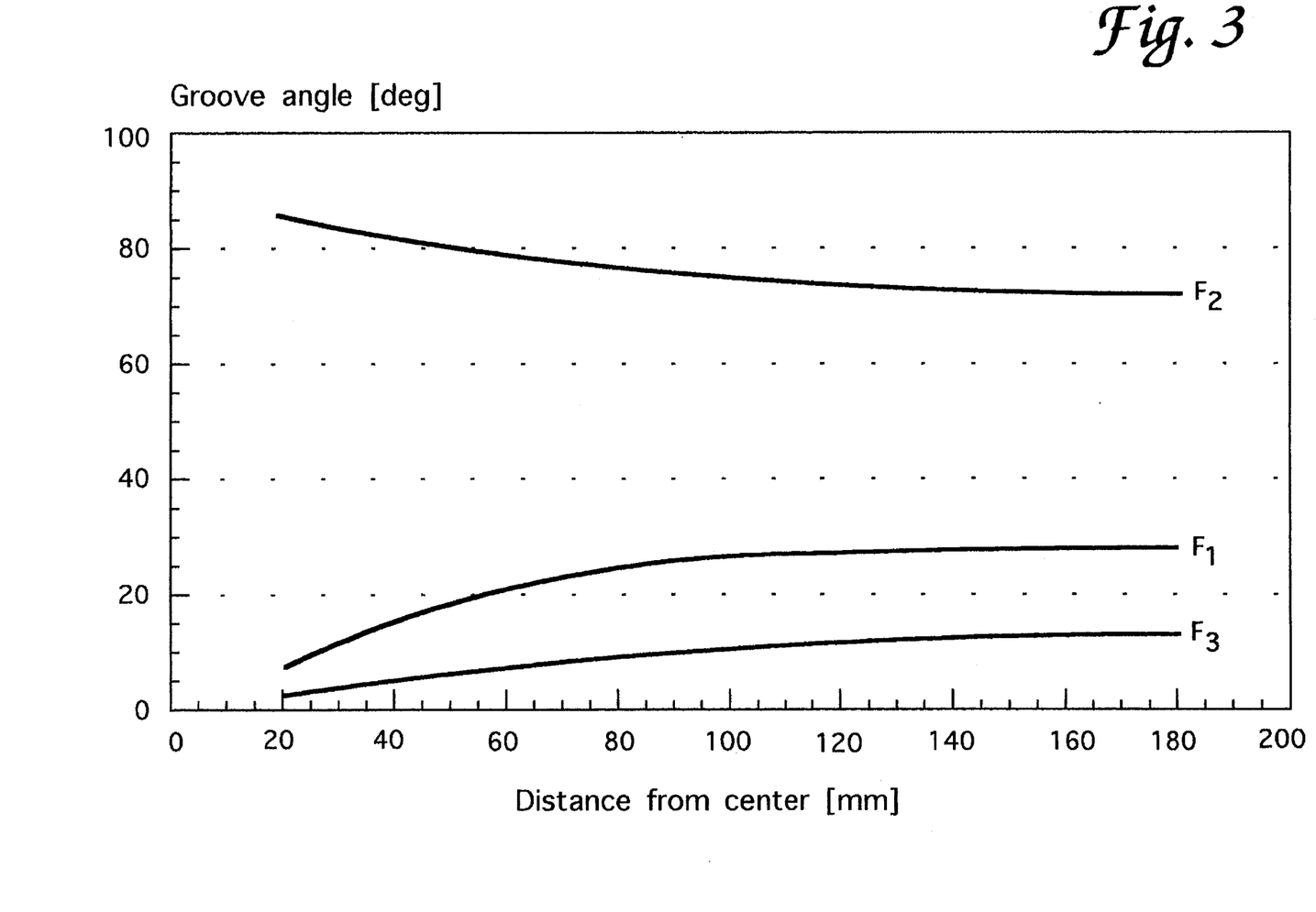
FIG. 3 is a graph depicting the groove angles of the catadioptric and dioptric lens elements of the lens system of FIG. 2.

Mutual cancellation of dispersion is achieved by the judicious selection of the groove angles of ridges 32 in both lenses 28 and 30. In the embodiment of FIG. 2, catadioptric lens 28 is convergent and has negative dispersion, and dioptric lens 30 is also convergent but has positive dispersion. In such a system, the following conditions must be satisfied:

$F_1 < (\phi_1 - \phi_2)$ and $\phi_2 < \phi_3$, where $F_1$ is the refracting groove angle of catadioptric lens 28, $\phi_1$ is the entrance ray angle, $\phi_2$ is the internal ray angle, and $\phi_3$ is the exit ray angle. There are a family of solutions that satisfy these conditions, depending on the chosen value of $\phi_2$. FIG. 3 graphically depicts one acceptable design of a doublet lens in accordance with the foregoing description, referenced by the groove angles $F_1$, $F_2$, and $F_3$ where $F_1$ is as above, $F_2$ is the reflecting (TIR) groove angle of catadioptric lens 28, and $F_3$ is the refracting groove angle of dioptric lens 30. For example, if FIG. 2 is assumed to represent a marginal light ray near the corner of an A4 size stage, and the optical parameters of lens system 24 include an object distance of about 89 mm and an image distance of about 350 mm, the following values are representative:

$F_1 = 25.2°$,
$F_2 = 71.9°$,
$F_3 = 12.2°$,
$\phi_1 = 63°$,
$\phi_2 = 20°$, and
$\phi_3 = 26.5°$.

Figure 4:
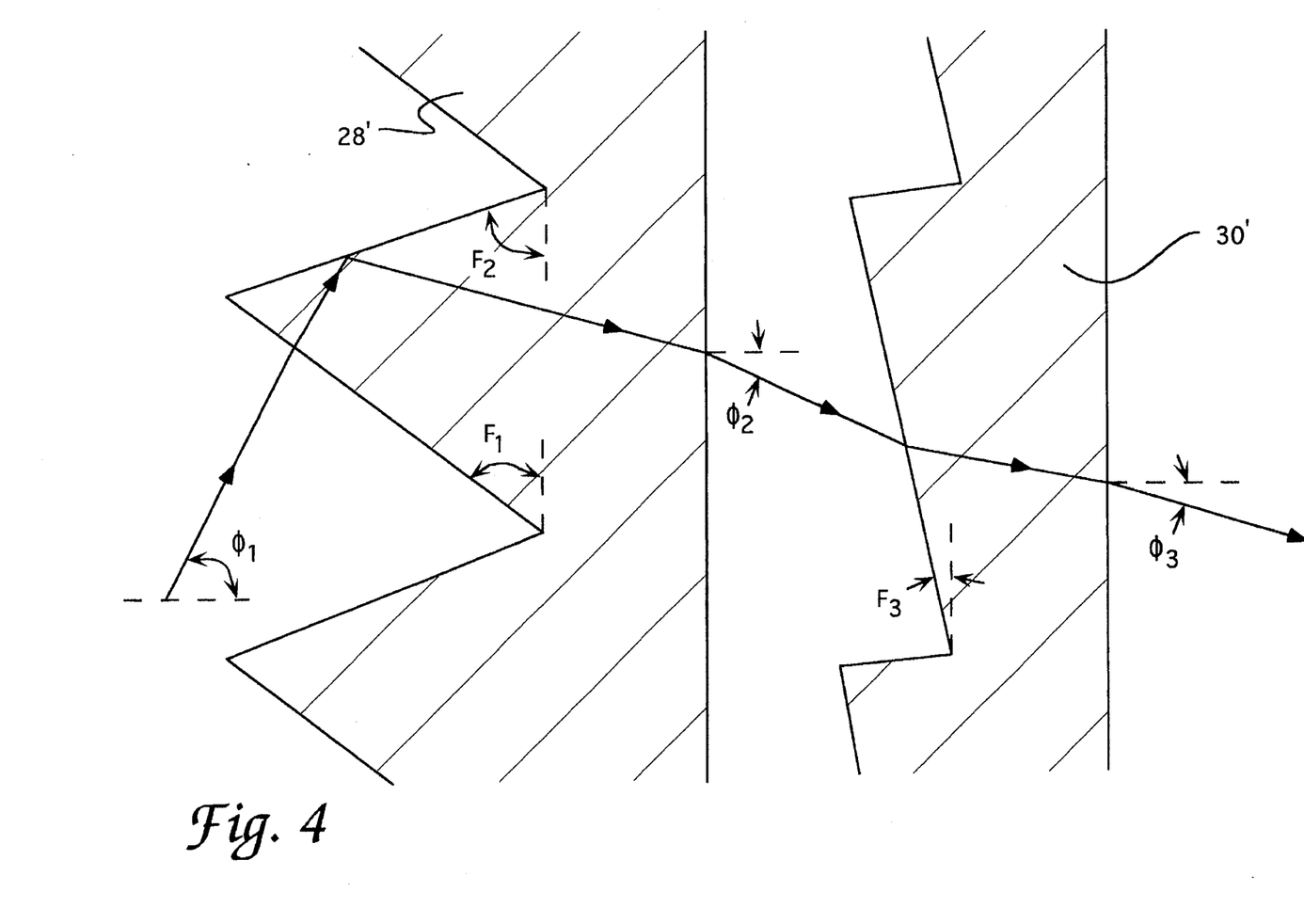
FIG. 4 is a detail view of another embodiment of the (doublet) achromatic lens system used in the overhead projector of the present invention.

Referring now to FIG. 4, an alternative embodiment of lens system 24 comprises a catadioptric lens 28' which is convergent and has positive dispersion, and a dioptric lens 30' which is divergent and has negative dispersion. In this system, the following conditions must be satisfied:

$F_1 > (\phi_1 - \phi_2)$ and $\phi_2 > \phi_3$.

Figure 5:
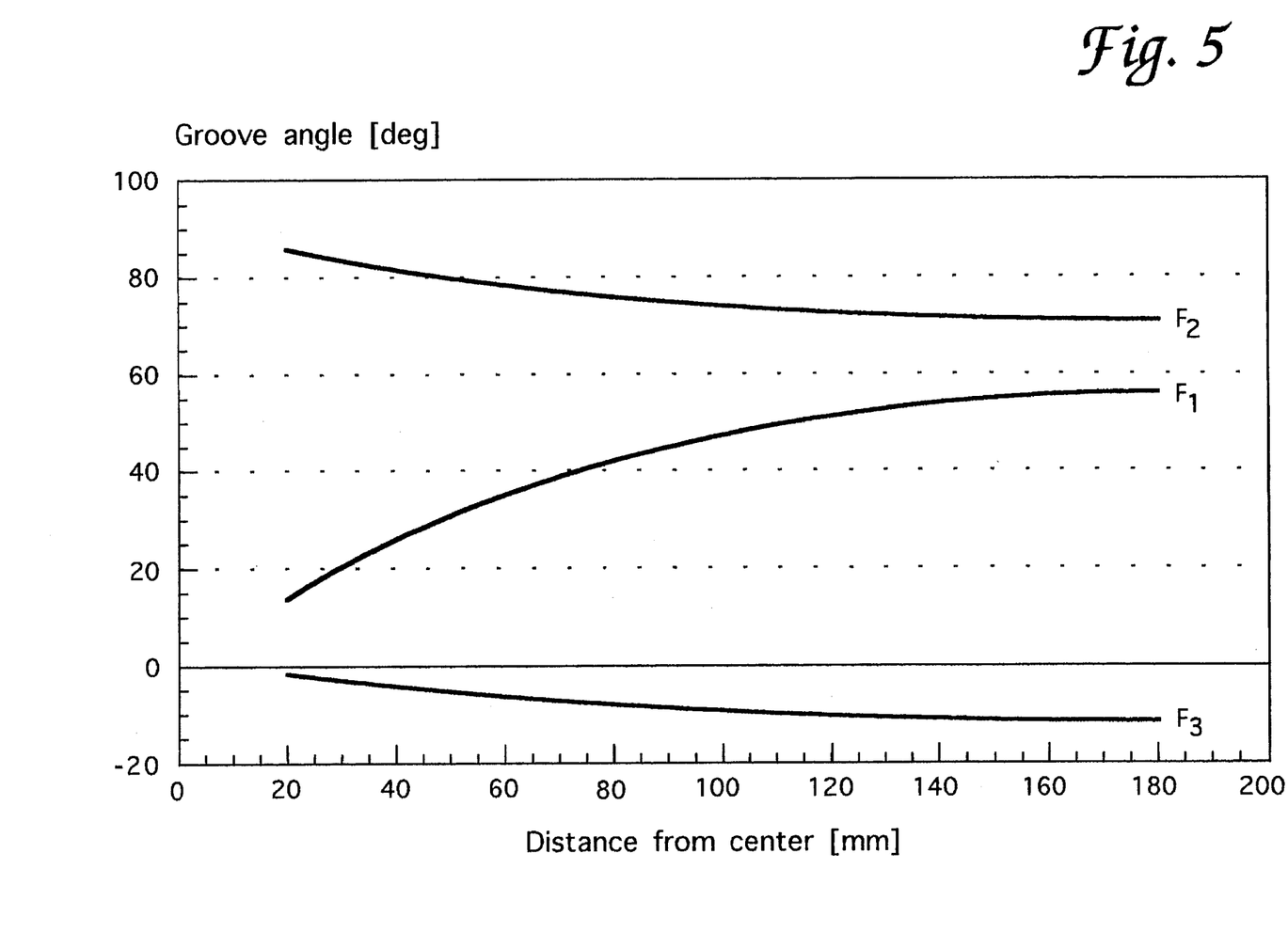
FIG. 5 is a graph depicting the groove angles of the catadioptric and dioptric lens elements of the lens system of FIG. 4.

FIG. 5 graphically depicts one acceptable design of a doublet lens in accordance with this alternative embodiment.

Figure 6:
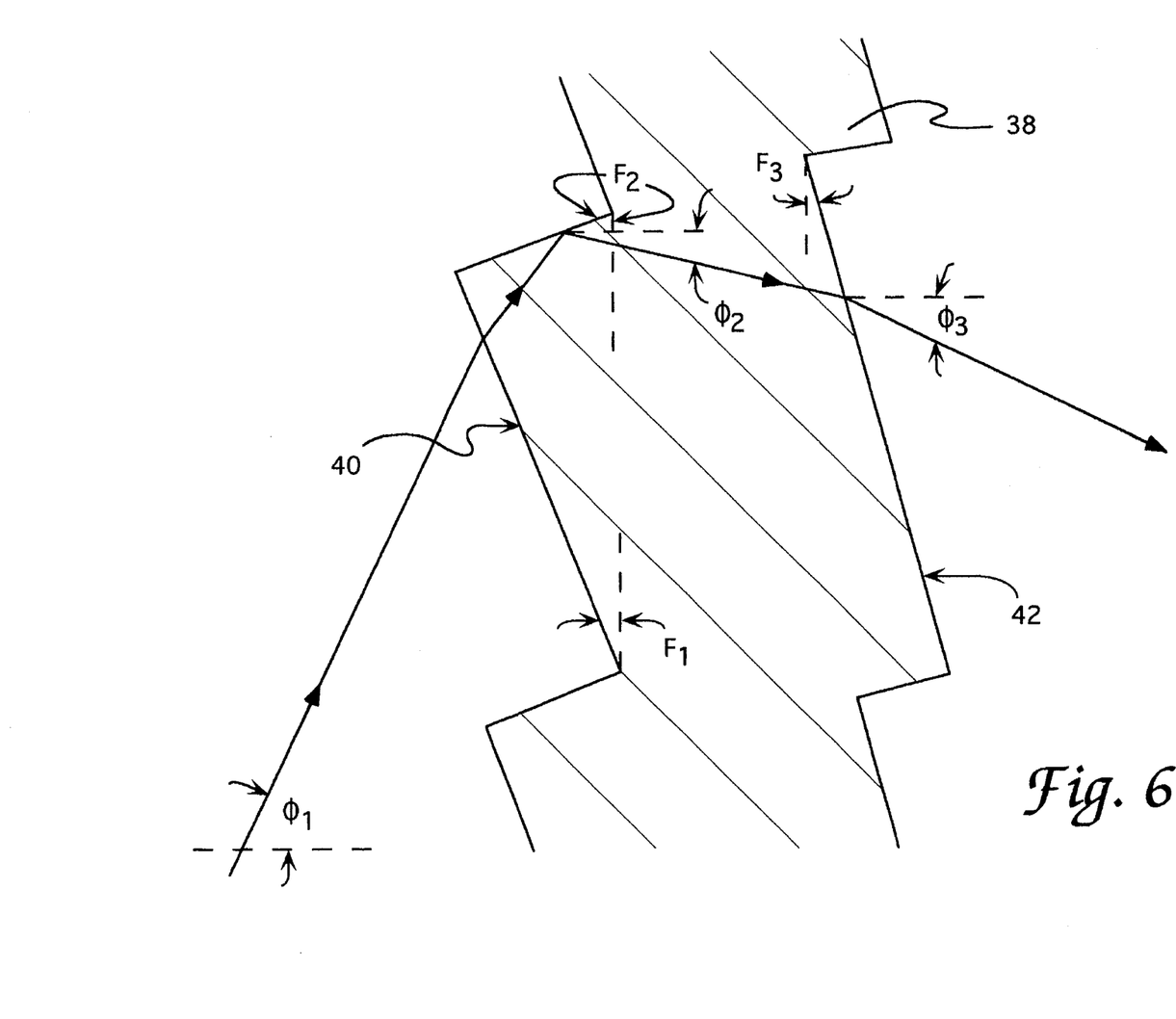
FIG. 6 is a detail view of yet another embodiment of the (singlet) achromatic lens system used in the overhead projector of the present invention.
Figure 7:
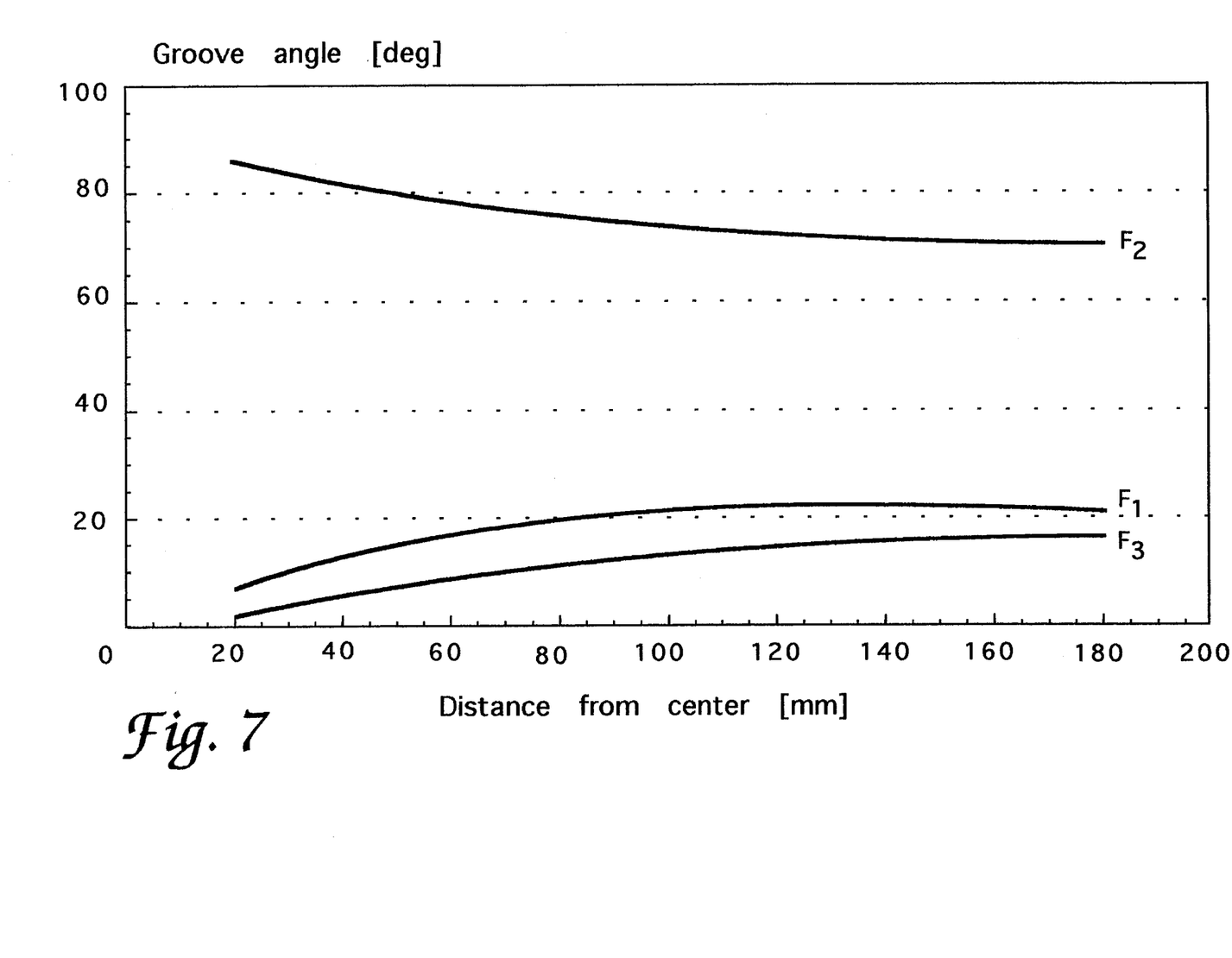
FIG. 7 is a graph depicting the groove angles of the catadioptric and dioptric lens elements of the lens system of FIG. 6.
Figure 8:
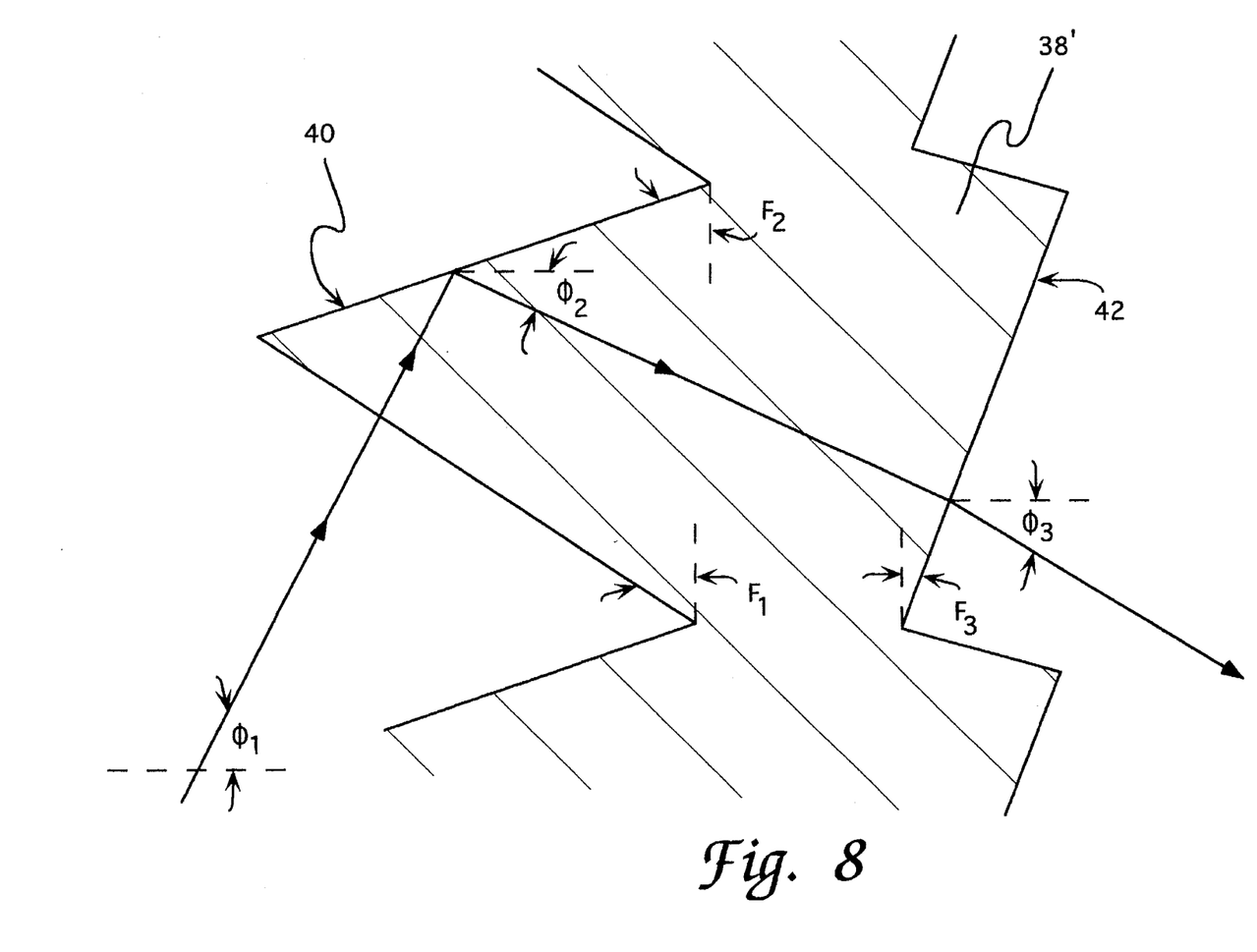
FIG. 8 is a detail view of one embodiment of the (singlet) achromatic lens system used in the overhead projector of the present invention.
Figure 9:
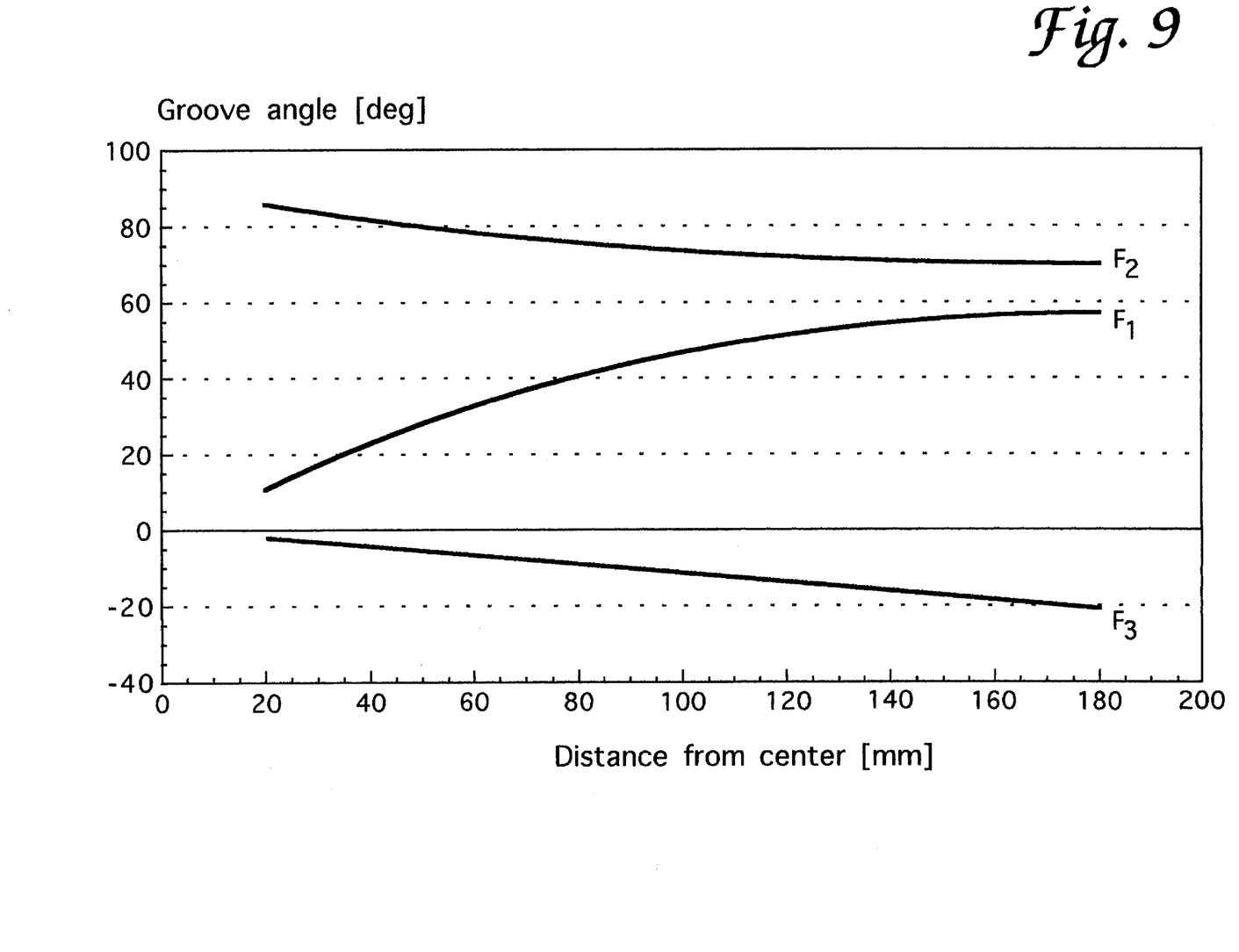
FIG. 9 is a graph depicting the groove angles of the catadioptric and dioptric lens elements of the lens system of FIG. 8.

The catadioptric surface of lens 28 and the dioptric surface of lens 30 may further be combined into a single lens element 38 as depicted in FIG. 6. Lens 38 is generally planar and has a catadioptric surface 40 which is convergent, and a dioptric surface 42 which is also convergent. The orientation of the grooves of dioptric surface 42 is selected to cancel out the dispersion at catadioptric surface 40. In this singlet system, the following conditions must be satisfied:

$F_1 < (\phi_1 - \phi_3)$ and $\phi_2 < \mathrm{asin}(\sin(\phi_3/n))$ where n is the index of refraction of the material forming the substrate for lens 38. Again, there is a family of solutions to these conditions, depending upon the value of $\phi_2$ ($\phi_2$ affects the transmission efficiency of the lens). FIG. 7 graphically depicts one acceptable design of a singlet lens in accordance with this embodiment. Another singlet lens 38' shown in FIG. 8 may be formed wherein dioptric surface 42 is divergent. In that singlet system, the following conditions must be satisfied:

$F_1 > (\phi_1 - \phi_3)$ and $\phi_2 > \mathrm{asin}(\sin(\phi_3/n))$.

In each of the foregoing embodiments, cancellation of the dispersion results in color correction which eliminates the need for color tuning of OHP 10. For rays closer to the optic axis, catadioptric lens 28 becomes much less efficient (as a result of designing the system to eliminate longitudinal chromatic aberration). This is due to a small percentage of light rays which are refracted by the lower surface of lens 28 and then reflected internally against the wall of ridges 32 of lens 28. Since the transmission of catadioptric lens 28 increases with increasing entrance angle, the normal screen illumination dropoff from the center of stage 14 to its edge will be more even than from a purely refractive lens system of the same focal length and aperture. Nevertheless, it may be desirable in practice to allow some color dispersion as a tradeoff for increased light transmission.

While the specific dimensions and optical parameters of OHP 10 may vary considerably depending upon the particular application, the following approximate values are considered exemplary. For an OHP having an A4 format (a stage area of about 285 mm×285 mm), a varifocal lens (having a focal length variation of 280 mm to 315 mm) is located 37 cm above stage 14. Dioptric Fresnel lens 30, having a focal length of 372 mm, and catadioptric lens 28, having a focal length of 89 mm, are positioned directly beneath glass writing platen 26. Each lens is pressed in a 2 mm thick sheet of acrylic plastic (refractive index 1.492) and has a groove frequency between 2 and 16 grooves per millimeter. The ratio of the groove frequencies between the upper and lower elements are chosen to minimize Moiré pattern interference between the two groove structures. A typical groove frequency ratio is 4.74:1. The lenses are packaged together and sealed along their perimeters, with a 0 to 1 mm spacing between the upper (plano) surface of lens 28 and ridges 32 of lens 30. Lamp 15 (an incandescent 400 watt, 36 volt lamp of the EVD type) is positioned 89 mm below lens 28. A plano-convex condenser 34 with a focal length between 250 mm and 500 mm is located 11 mm above lamp 15, and the vertex of a back spherical reflector 36 with a dichroic cold mirror coating is located 25 mm below lamp 15. The effective base height of this exemplary OHP is about 13 cm, resulting in a very portable machine, particularly when the projection head is folded downward.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. An achromatic lens system comprising:
 a catadioptric lens having an upper plano surface and a lower surface, said lower surface having a plurality of prismatic ridges and grooves, said catadioptric lens having dispersion resulting in chromatic aberration; and
 a dioptric lens having an upper plano surface and a lower surface, said lower surface having a plurality of prismatic ridges and grooves and being located adjacent said upper plano surface of said catadioptric lens, said dioptric lens having dispersion generally opposite that of said catadioptric lens whereby said chromatic aberration is essentially eliminated.

2. The achromatic lens system of claim 1 wherein:
 said catadioptric lens is convergent and has negative dispersion; and said dioptric lens is convergent and has positive dispersion.

3. The achromatic lens system of claim 1 wherein:

said catadioptric lens is convergent and has positive dispersion; and said dioptric lens is divergent and has negative dispersion.

4. The achromatic lens system of claim 1 wherein said catadioptric lens and said dioptric lens have approximately equal indices of refraction.

5. The achromatic lens system of claim 1 wherein:

said ridges and grooves of said catadioptric lens are generally circular, defining an effective center;

said ridges and grooves of said dioptric lens are generally circular, defining an effective center; and said catadioptric and dioptric lenses are oriented whereby said effective center of said dioptric lens overlies said effective center of said catadioptric lens.

6. An overhead projector utilizing the lens system of claim 1, said overhead projector including:

a base having a stage area;

a projector head mounted to said base, proximate said stage area;

a light source in said base;

means for directing light from said light source towards said stage area; and lens means for condensing light from said stage area toward said projector head, said condensing lens means including the lens system of claim 1.

7. The achromatic lens system of claim 2 wherein the following conditions are satisfied:

$F_1 < (\phi_1 - \phi_2)$ and $\phi_2 < \phi_3$, where $F_1$ is a refracting groove angle of said catadioptric lens, $\phi_1$ is an entrance angle of a light ray entering said lower surface of said catadioptric lens, 42 is an internal angle of said light ray between said upper plano surface of said catadioptric lens and said lower surface of said dioptric lens, and 43 is an exit angle of said light ray exiting said upper plano surface of said dioptric lens.

8. The achromatic lens system of claim 3 wherein the following conditions are satisfied:

$F_1 > (\phi_1 - \phi_2)$ and $\phi_2 > \phi_3$, where $F_1$ is a refracting groove angle of said catadioptric lens, $\phi_1$ is an entrance angle of a light ray entering said lower surface of said catadioptric lens, $\phi_2$ is an internal angle of said light ray between said upper plano surface of said catadioptric lens and said lower surface of said dioptric lens, and 43 is an exit angle of said light ray exiting said upper plano surface of said dioptric lens.

9. The achromatic lens system of claim 4 wherein said catadioptric lens and said dioptric lens are constructed of a polymeric thermoplastic having an index of refraction of at least about 1.4.

10. An achromatic singlet lens comprising:

a generally planar substrate having first and second surfaces;

said first surface having a plurality of prismatic ridges and grooves forming a catadioptric surface, said ridges and grooves of said catadioptric surface being generally circular, defining an effective center, and said catadioptric surface exhibiting dispersion;

said second surface having a plurality of prismatic ridges and grooves forming a dioptric surface, said ridges and grooves of said dioptric lens being generally circular, defining an effective center, and said ridges and grooves of said dioptric surface being oriented to essentially cancel said dispersion of said catadioptric surface; and said effective center of said dioptric lens coinciding with said effective center of said catadioptric lens.

11. The achromatic singlet lens of claim 10 wherein:

said catadioptric surface is convergent;

said dioptric surface is convergent; and the following conditions are satisfied:

$F_1 < (\phi_1 - \phi_3)$ and $\phi_2 < \mathrm{asin}(\sin(\phi_3)/n)$ where $F_1$ is a refracting groove angle of said catadioptric surface, $\phi_1$ is an entrance angle of a light ray entering said catadioptric surface, $\phi_2$ is an internal angle of said light ray between said catadioptric surface and said dioptric surface, $\phi_3$ is an exit angle of said light ray exiting said dioptric surface, and n is the index of refraction of the substrate.

12. The achromatic singlet lens of claim 10 wherein:

said catadioptric surface is convergent;

said dioptric surface is divergent; and the following conditions are satisfied:

$F_1 > (\phi_1 - \phi_3)$ and $\phi_2 > \mathrm{asin}(\sin(\phi_3)/n)$ where $F_1$ is a refracting groove angle of said catadioptric surface, $\phi_1$ is an entrance angle of a light ray entering said catadioptric surface, $\phi_2$ is an internal angle of said light ray between said catadioptric surface and said dioptric surface, $\phi_3$ is an exit angle of said light ray exiting said dioptric surface, and n is the index of refraction of the substrate.

13. An overhead projector utilizing the achromatic singlet lens of claim 10, said overhead projector including:

a base having a stage area;

a projector head mounted to said base, proximate said stage area;

a light source in said base;

means for directing light from said light source towards said stage area; and lens means for condensing light from said stage area toward said projector head, said condensing lens means including the achromatic singlet lens of claim 10.

* * * * *